No. 831,141. PATENTED SEPT. 18, 1906.
A. W. CASH.
CHECK VALVE.
APPLICATION FILED MAY 23, 1905.

WITNESSES
Ralph Lancaster
Russell M. Everett

INVENTOR
Arthur W. Cash,
BY Charles H. Pell,
ATTORNEY.

UNITED STATES PATENT OFFICE.

ARTHUR W. CASH, OF NEWARK, NEW JERSEY.

CHECK-VALVE.

No. 831,141.　　　Specification of Letters Patent.　　　Patented Sept. 18, 1906.

Application filed May 23, 1905. Serial No. 261,747.

*To all whom it may concern:*

Be it known that I, ARTHUR W. CASH, a citizen of the United States, residing at Newark, in the county of Essex and State of New Jersey, have invented certain new and useful Improvements in Check-Valves; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates more particularly to that class of straightway check-valves, and particularly to those of large size, where for the purposes of strength and durability very considerable metal is consumed in the manufacture. Owing to a liability to corrode, the interior parts are usually made of some form of brass or bronze, and thus considerable expense is involved in their manufacture.

The objects of this invention are to reduce the cost of the valves by enabling the quantity of expensive metal employed to be reduced; to enable the valves to be easily repaired by the interchange of parts; to enable the weight of the valve to be reduced and to enable a valve of a given capacity to be made more compact in construction, and consequently more neat in appearance; to reduce the expense of labor in manufacturing the valve, and to secure other advantages and results, some of which may be hereinafter referred to in connection with the description of the working parts.

The invention consists in the improved check-valve and in the arrangements and combinations of parts of the same, all substantially as will be hereinafter set forth and finally embraced in the clauses of the claim.

Figure 1:
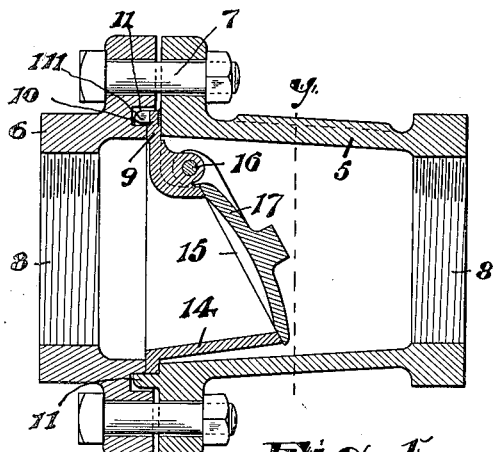
Figure 2:
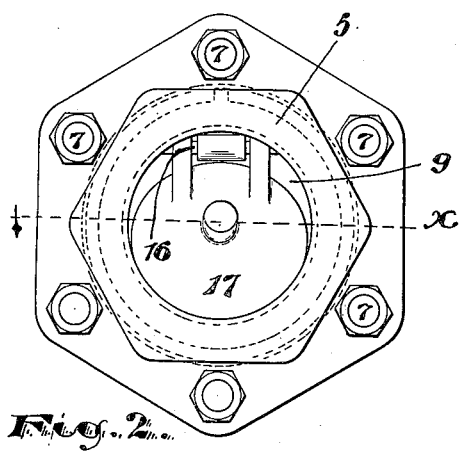
Figure 4:
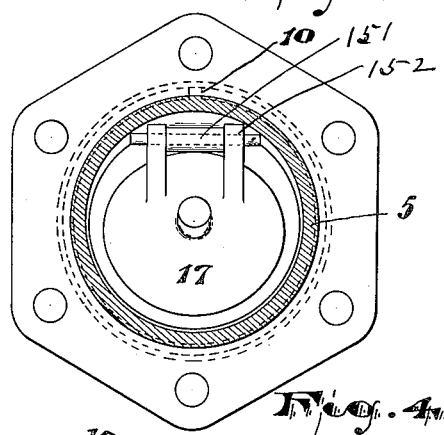
Figure 3:
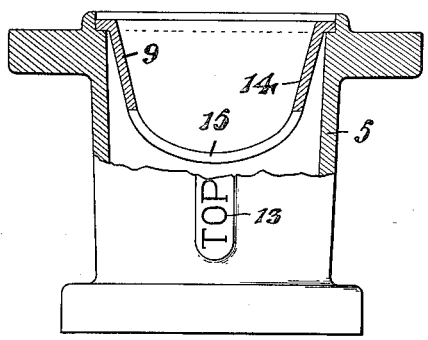
Figure 5:
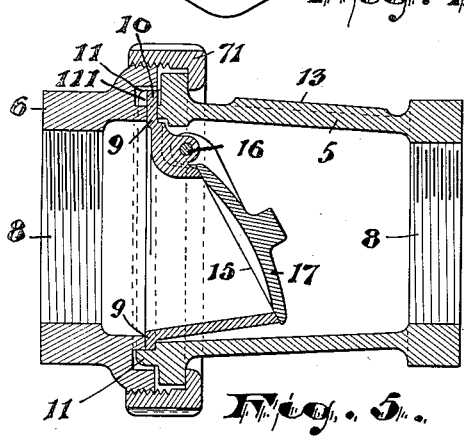
Figure 6:
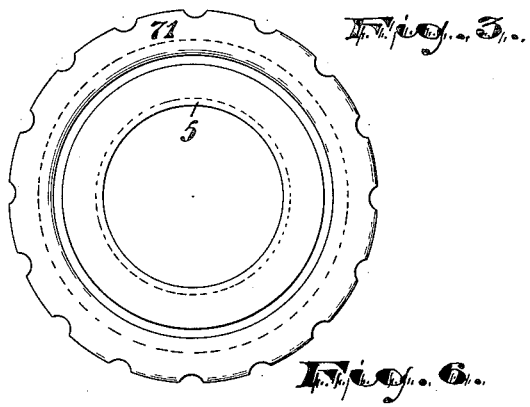

Referring to the accompanying drawings, in which like numerals of reference indicate corresponding parts in each of the several figures, Figure 1 is a longitudinal section of a valve of my improved construction. Fig. 2 is an end view of the same. Fig. 3 is a plan, partly in horizontal section, taken at line $x$ of Fig. 2. Fig. 4 is a section taken at line $y$ of Fig. 1. Fig. 5 illustrates in longitudinal section a modification of construction, and Fig. 6 is an end view of the body-sections of such modification.

In said drawings, 5 6 are two sections of the body of the valve joined together by bolts 7 or threaded rings 71, as indicated in Figs. 1 and 5, to form the body of the valve, the said sections being interiorly threaded, as at 8, to receive the pipes or parts through which the fluid is conducted to and from the valve. The contiguous parts of said sections 5 6 provide seats for a separable ring 9, adapted to be interposed between said sections and form an impervious joint by packing or other suitable means, a recess 111 being preferably formed in the extension 11 of the section 5 to receive a guide-lug 10, so arranged with respect to the ring-bearings for the swinging valve and the body-section 5 as to hold the hinge-bearings of said swinging valve at the side of the body-section 5 having the indicating marks or words 13. (Illustrated by Fig. 5.) The construction enables the workman to finally place the hinge of the valve at the top of the valve-body, so that the swinging valve will gravitate to its seat, as indicated in Fig. 5. The recessed body-section is marked so that the top or location of the hinge-bearings will be known when the valve is in connection with the pipes, the mark 13 being illustrated in Fig. 3.

The ring 9 at the side opposite that having the guiding-lug 11 projects into the section 5 and forms a short tubular or approximately tubular extension 14, having a beveled extremity 15, at the top or above which is formed a bearing 151, Fig. 4, for a hinge-pin 16, the said bearing 151 being integral with the ring. From said hinge-pin 16 is suspended the swing-valve 17. Said hinge-pin is of a length sufficient to extend through the bearing 151 of the ring and perforated ears 152 of the valve 17 and impinge upon the opposite walls of the tubular section 5, so that when the valve pivoted on the ring 9 is thrust into position in said section 5 the said pin is separably locked in place against longitudinal movement, and when the said ring is withdrawn the said pin is free to be withdrawn from the valve to release and enable the same to be manipulated for the purposes of cleansing or repair. The said pin or bearing 16 is formed or secured on the upper side of the ring 9, having the lug 10, and the inclined edge or seat 15 faces upwardly, so that the swinging valve will rest thereon by gravity when there is little or no force of flowing fluid from behind. Should the swinging valve become defective by wear or corrosion, it is obvious that said valve and its supporting ring or frame can be easily removed and another substituted with little expense and loss of time.

In assembling the parts preliminary to operation the section 6 is screwed upon its pipe. The loose intermediate ring or section is then thrust into the section 6 in the manner indicated in Fig. 1, the lug 10 entering the recess 111 of the extension 11 of the section 6 and holding the hinged side of the swinging valve at the side of said section 5 having the marks 13. The section 5 is then screwed to its pipe and the sections coupled, the section 5 finally lying with the marks 13 uppermost, showing that the hinged swinging valve is in proper operative relation and ready for service.

Having thus described the invention, what I claim as new is—

1. A check-valve comprising a pair of body-sections, means for uniting them, the sections having an annular recess between them, a valve-seat having a flange to fit between the sections and having a hinge thereon, a swinging valve on the hinge, and a lug on the flange at the top of the valve to fit in a recess in one of the sections.

2. The improved valve, comprising body-sections and means for separably uniting the same together and to pipes or conduits, and having a recess, a ring having a lug to enter said recess, and a swinging valve on said ring, substantially as set forth.

In testimony that I claim the foregoing I have hereunto set my hand this 17th day of May, 1905.

ARTHUR W. CASH.

Witnesses:
CHARLES H. PELL,
JOSEPH A. WELLS.